May 29, 1934.  J. F. ROBB  1,960,456
MACHINE FOR MAKING FROZEN CONFECTIONS
Filed July 13, 1932   11 Sheets-Sheet 2
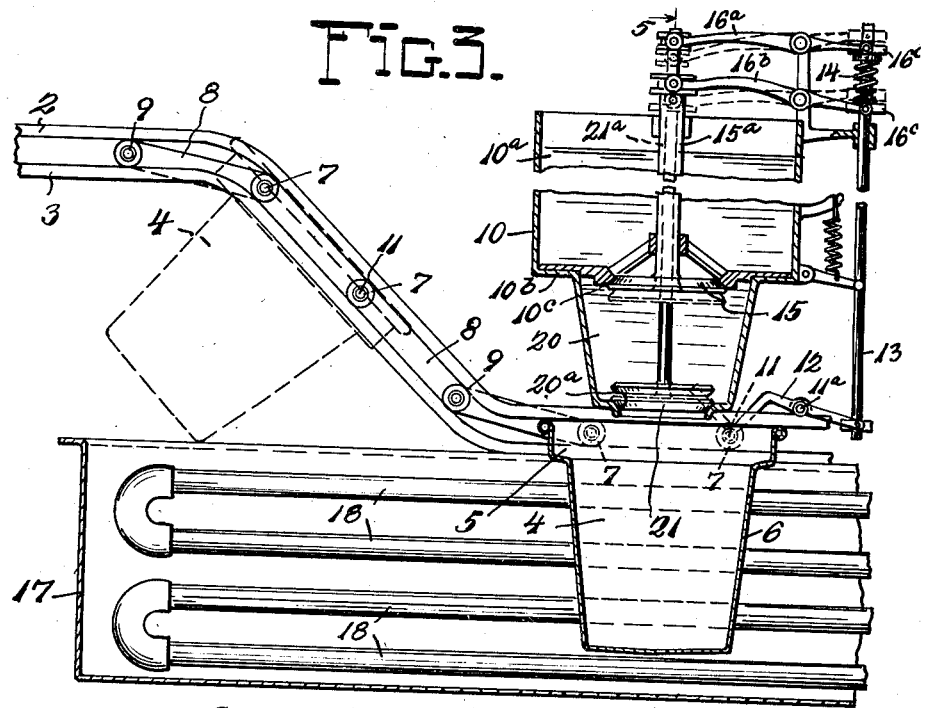
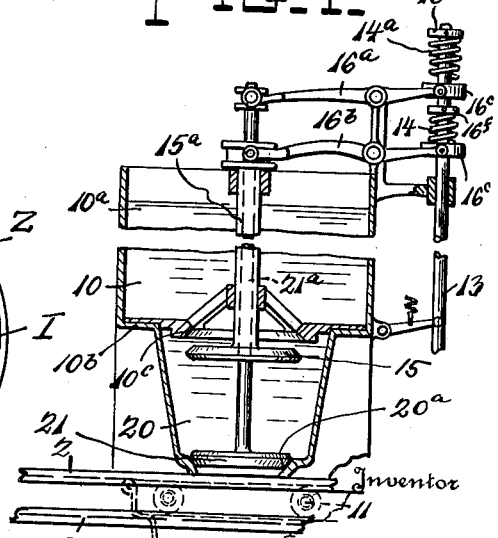
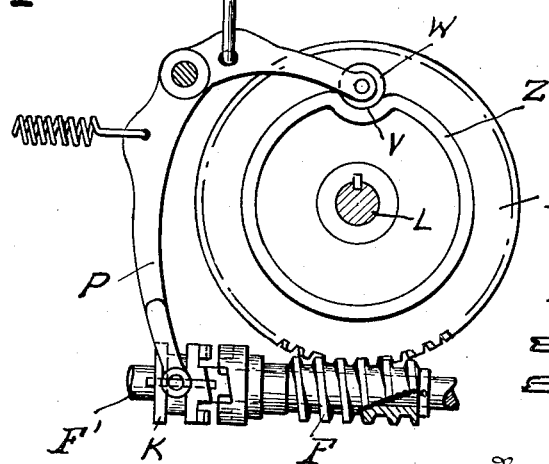

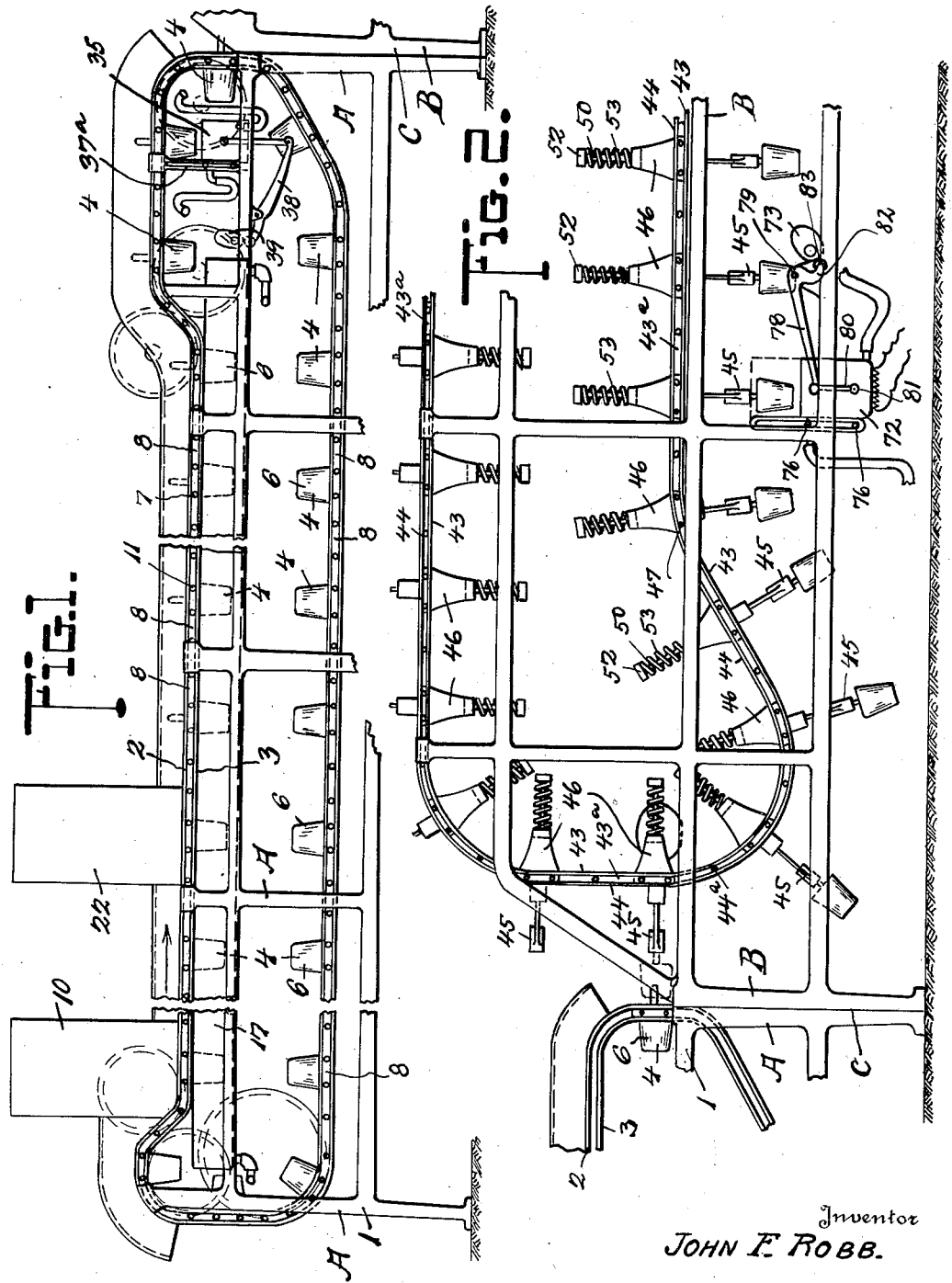

May 29, 1934.  J. F. ROBB  1,960,456
MACHINE FOR MAKING FROZEN CONFECTIONS
Filed July 13, 1932   11 Sheets-Sheet 3
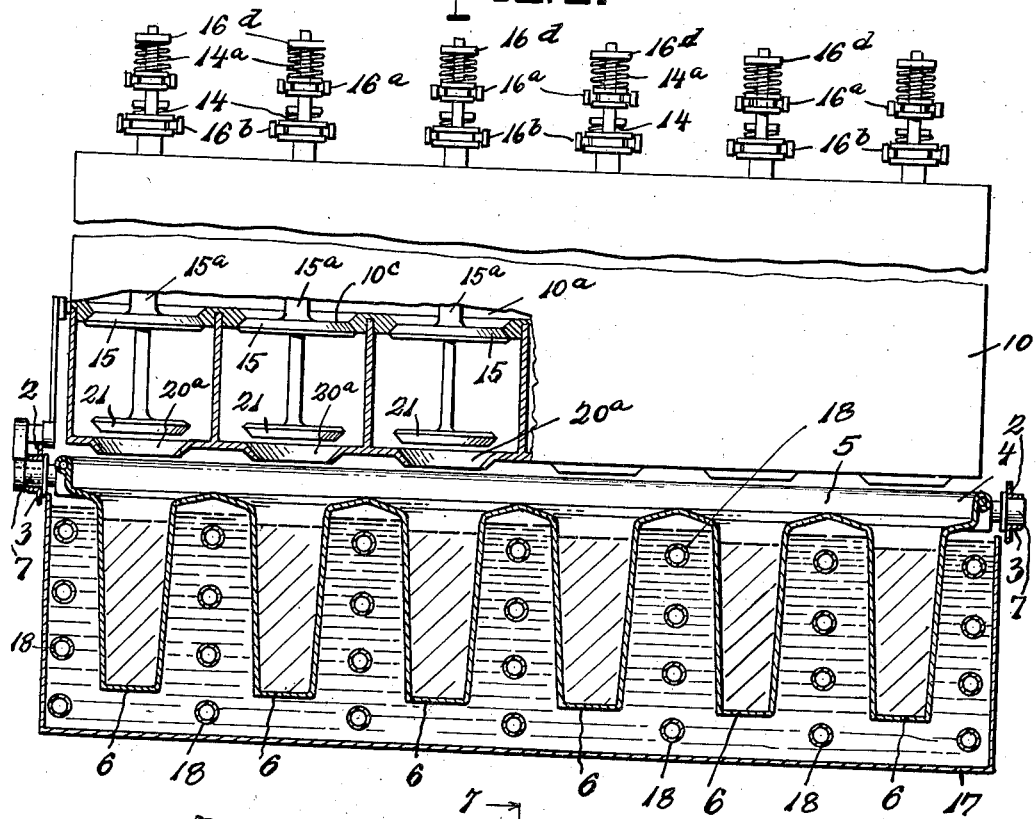
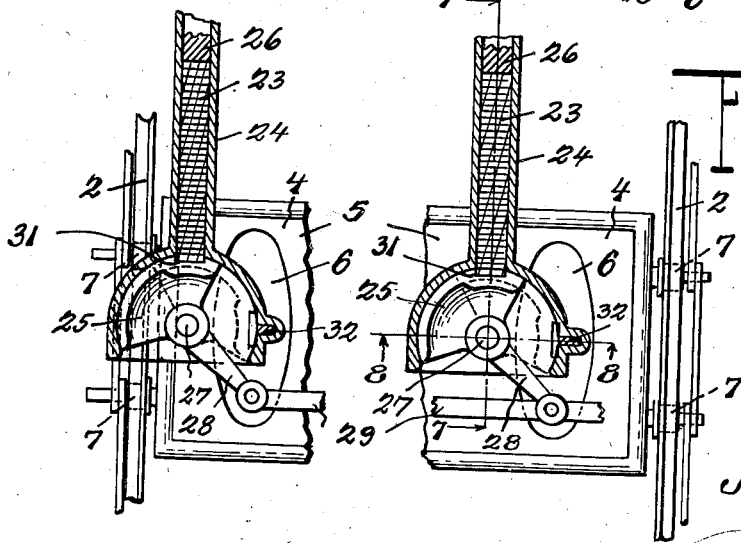
Inventor
John F. Robb
By
Robb & Robb
Attorneys May 29, 1934.   J. F. ROBB   1,960,456
MACHINE FOR MAKING FROZEN CONFECTIONS
Filed July 13, 1932   11 Sheets-Sheet 4
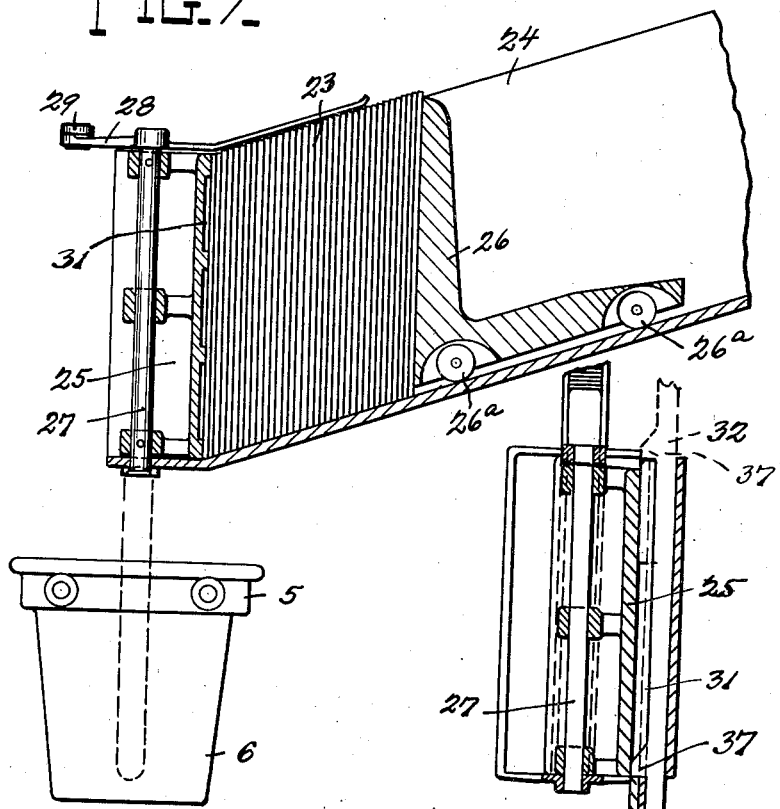
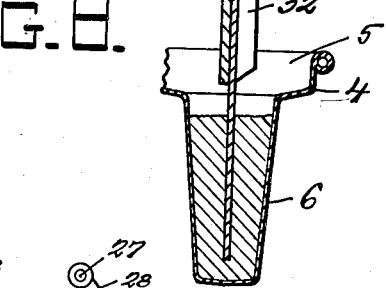
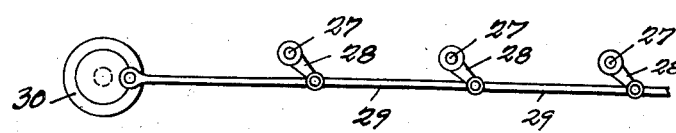
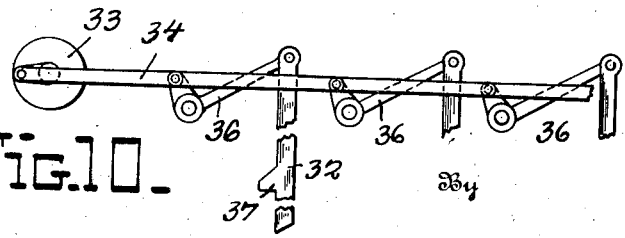
Inventor
JOHN F. ROBB.
By Robert Robb
Attorneys

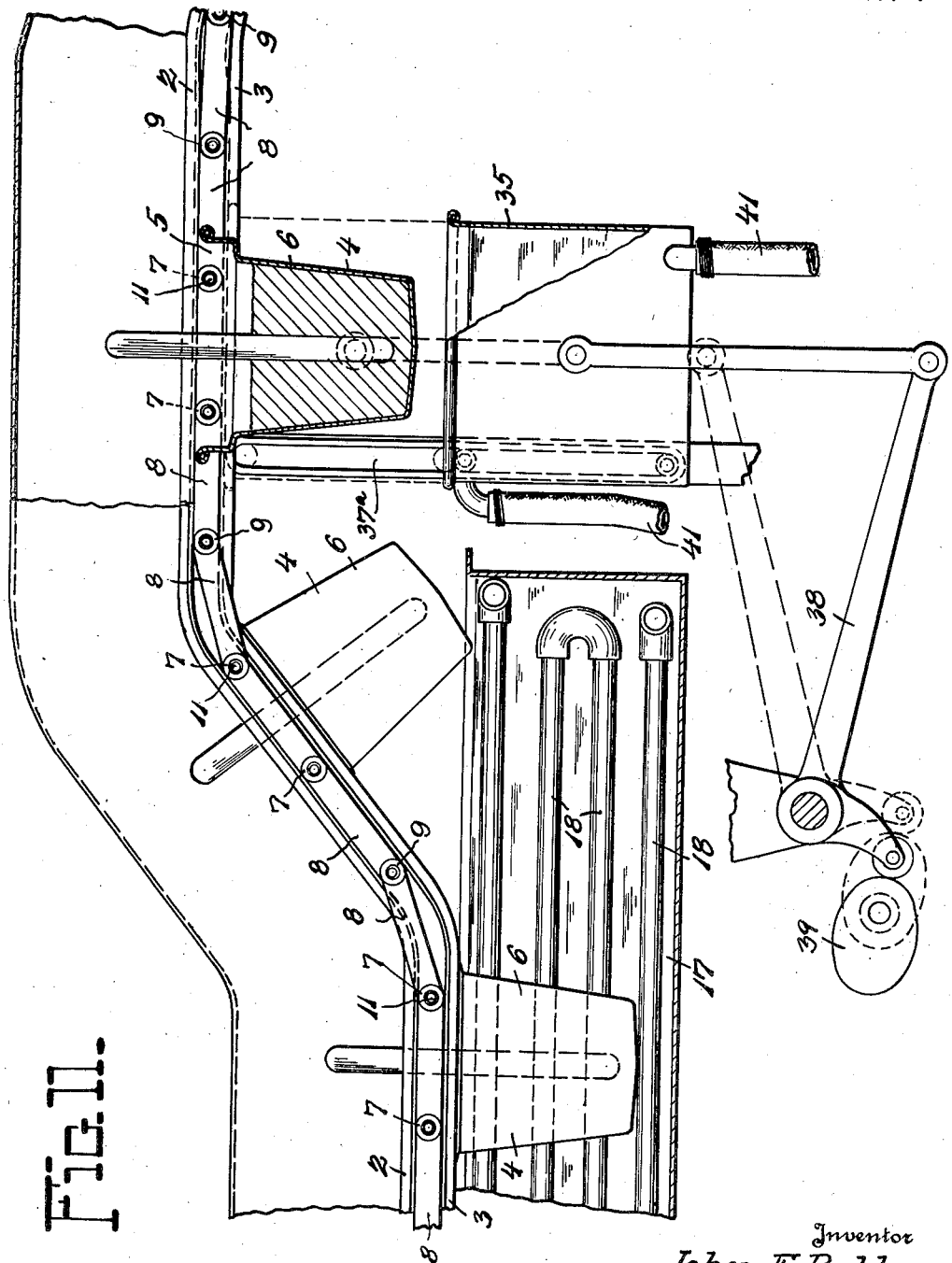

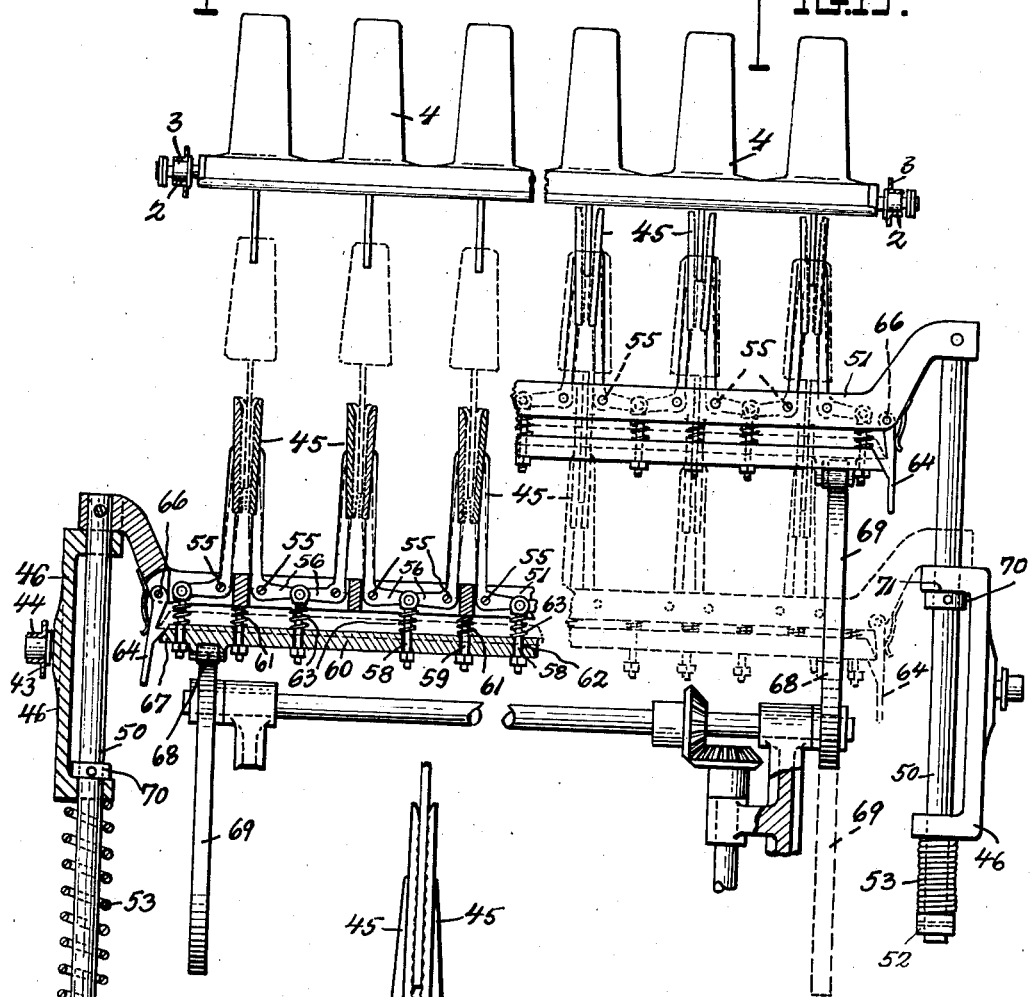

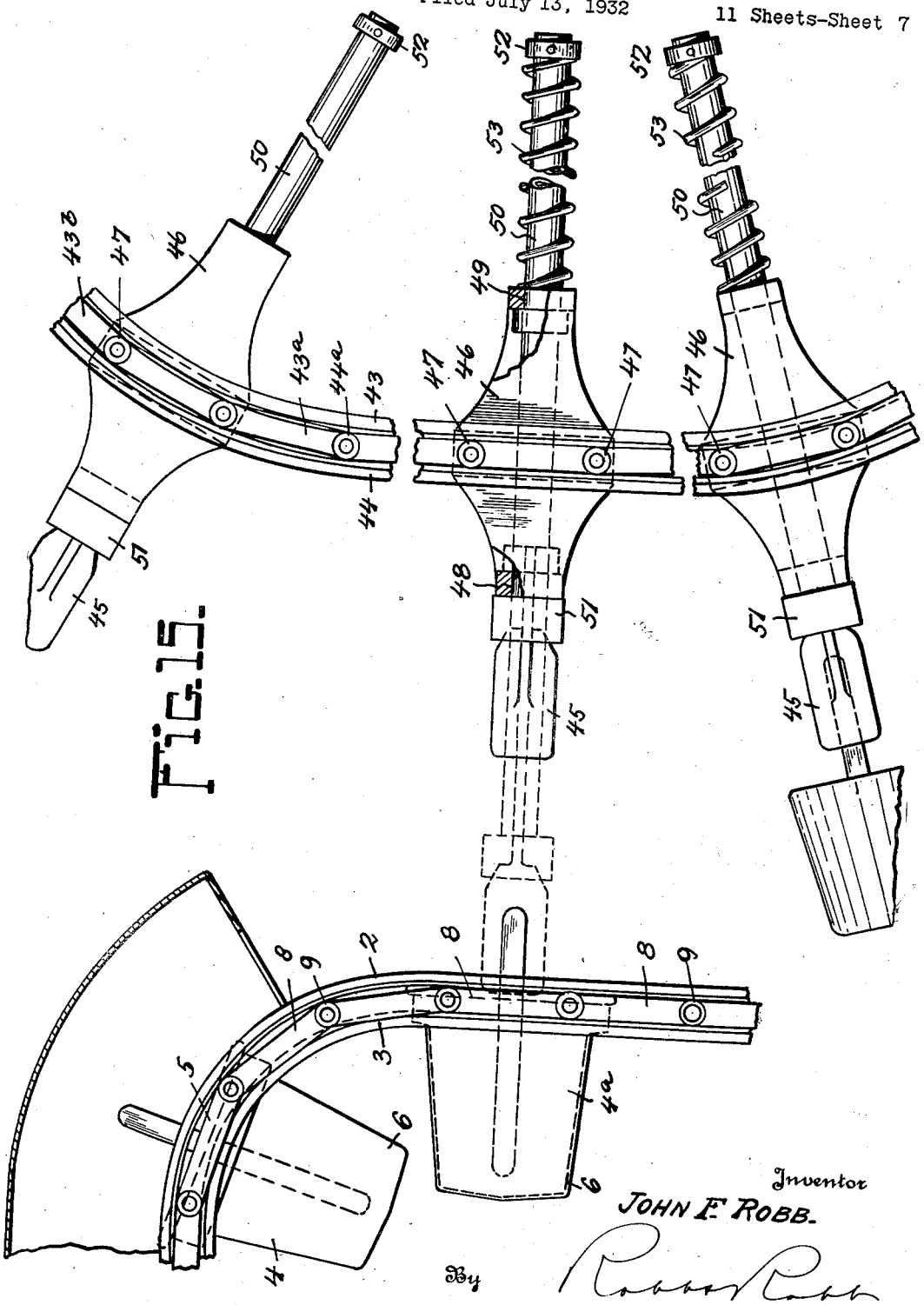

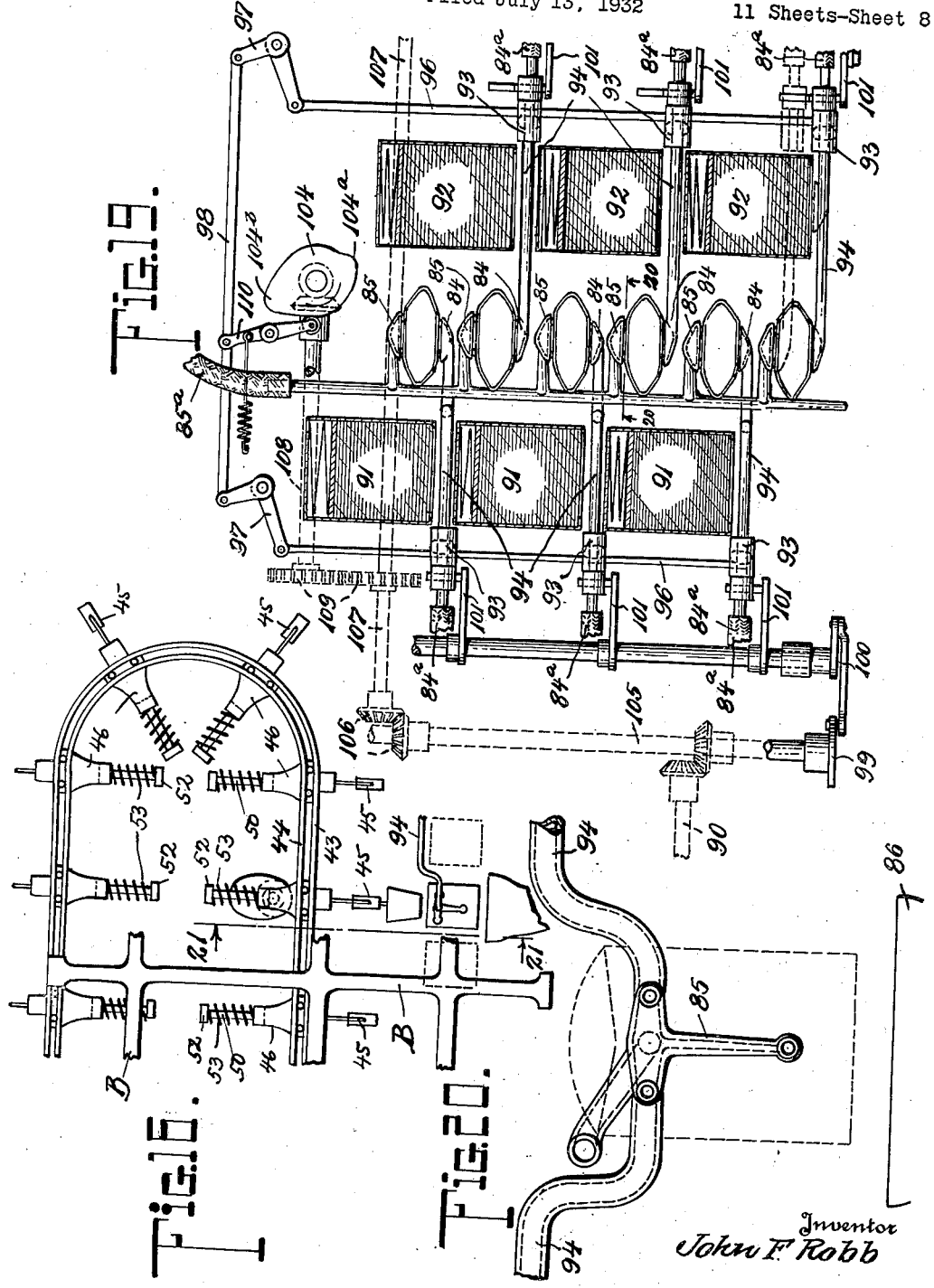

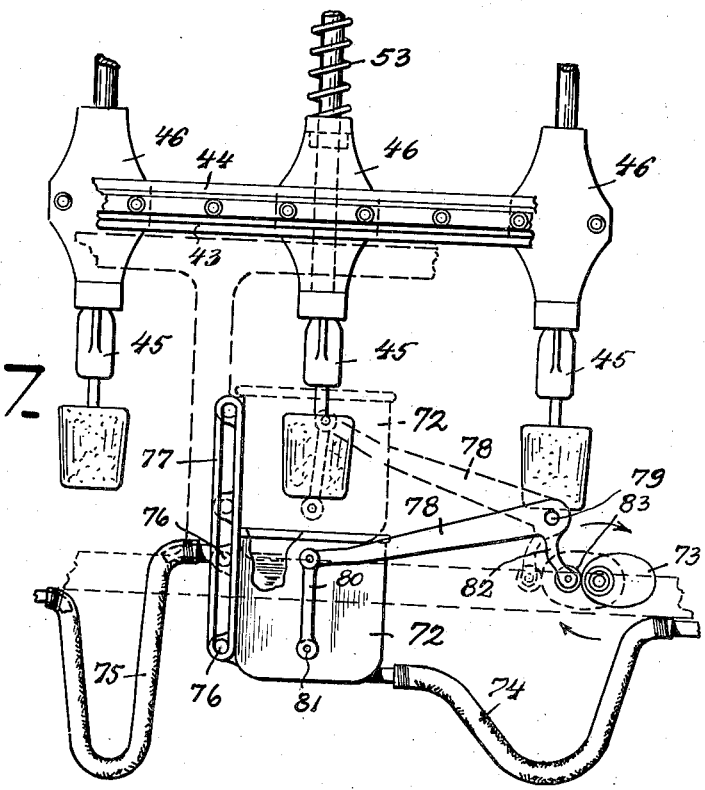
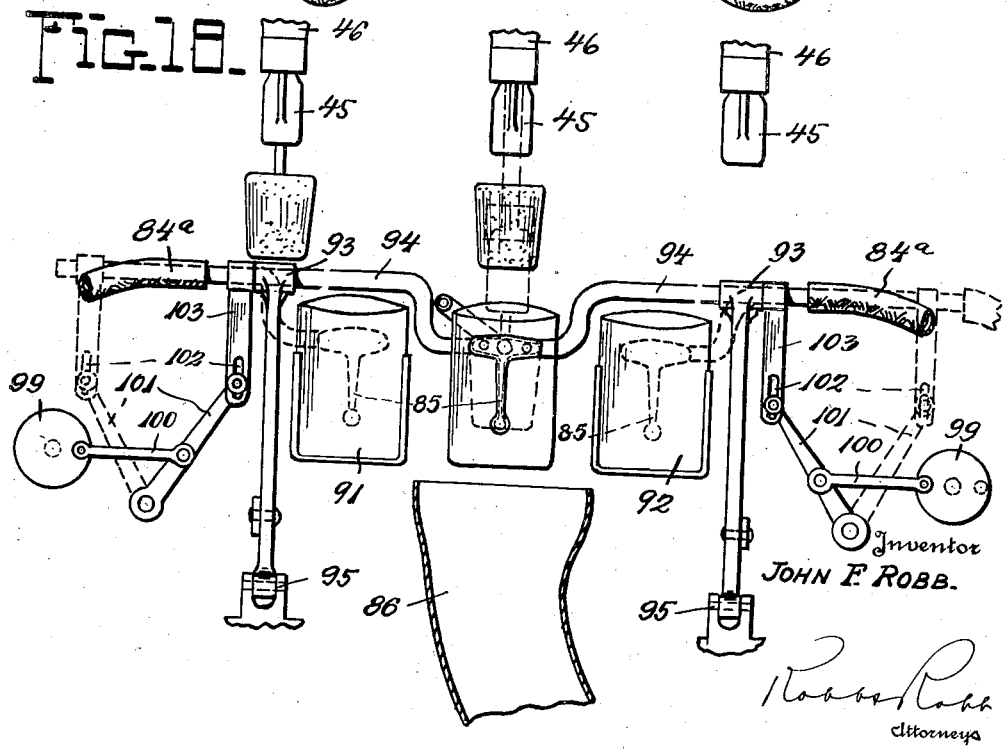

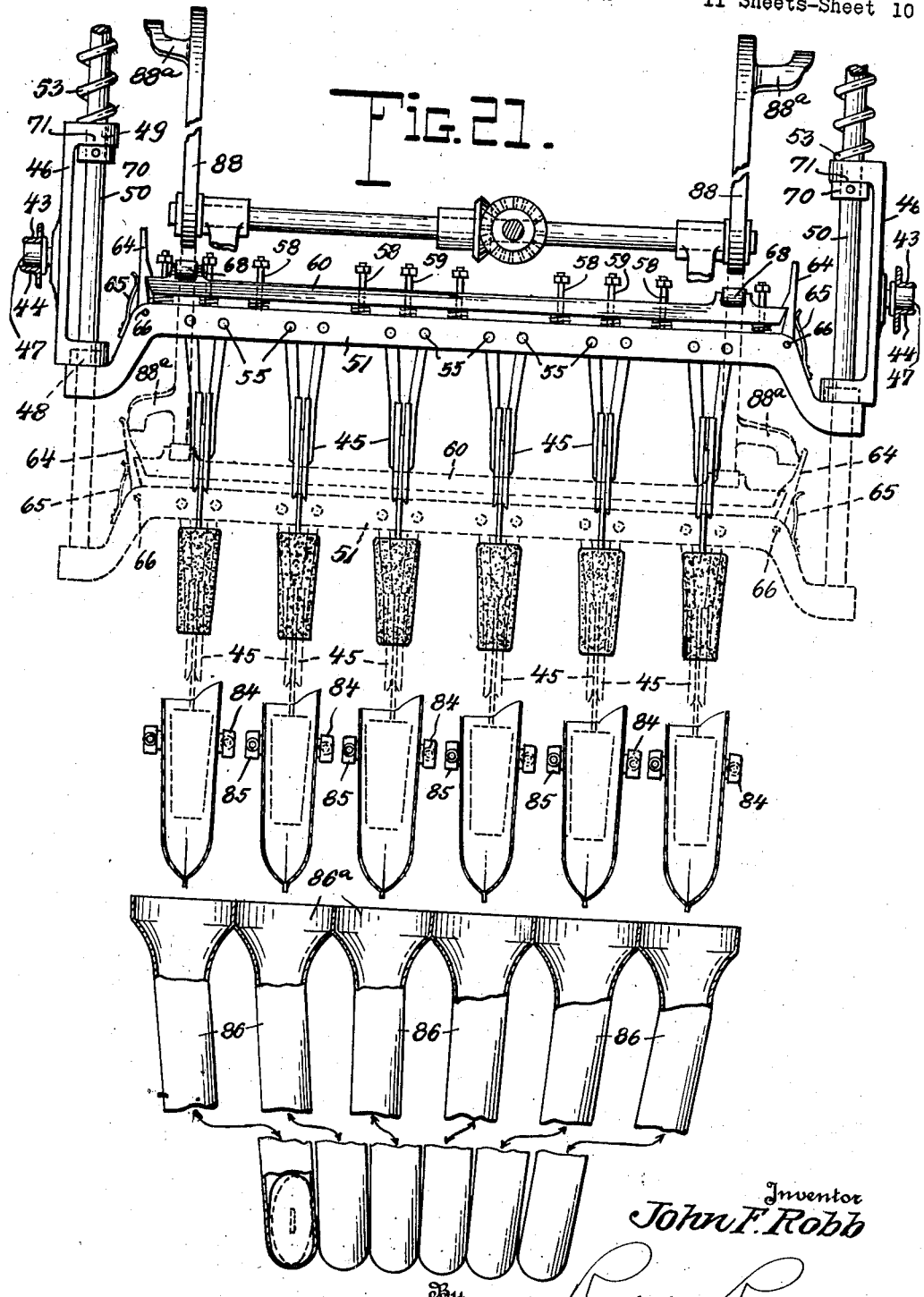

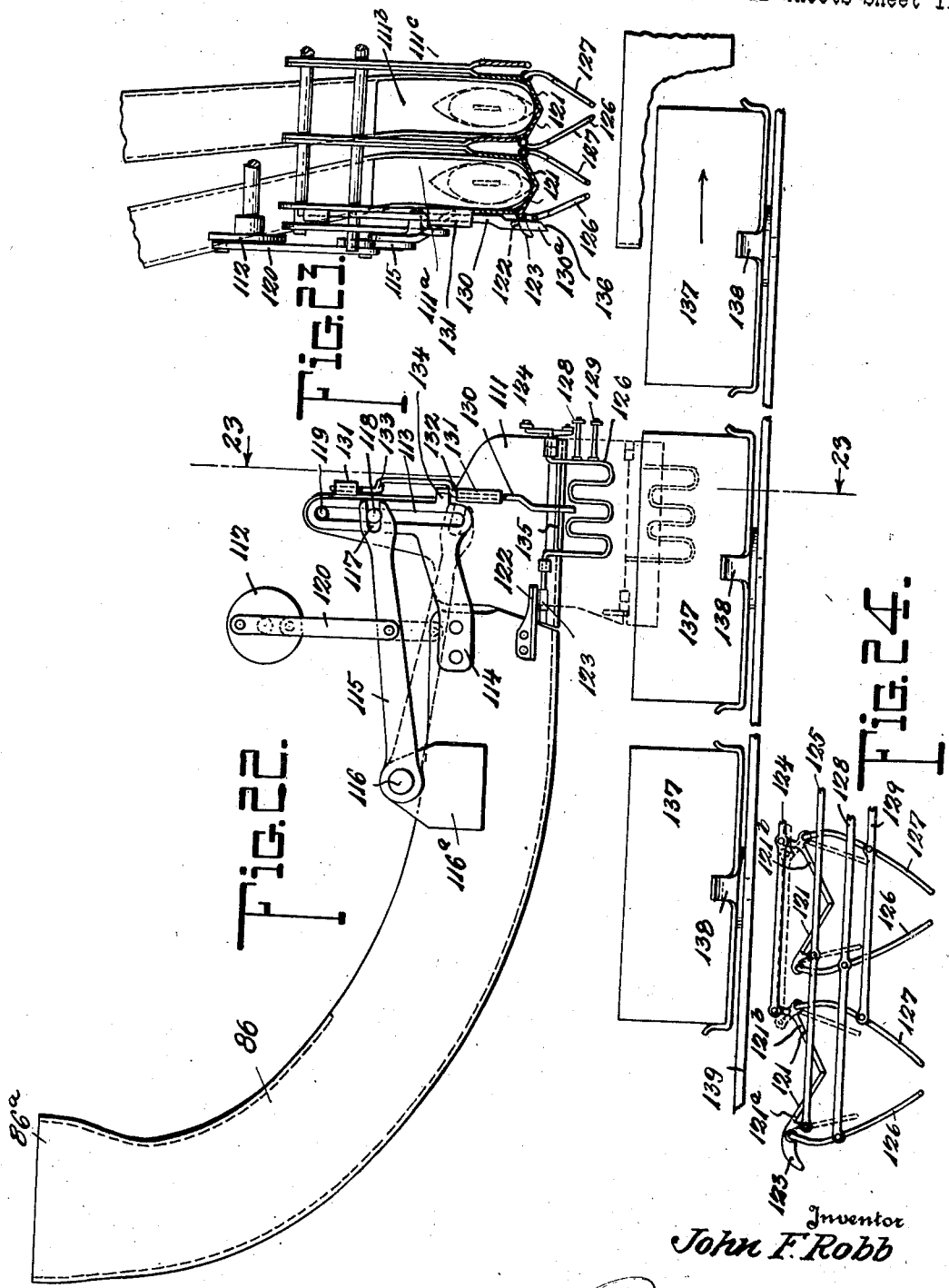

Patented May 29, 1934

1,960,456

UNITED STATES PATENT OFFICE 1,960,456

MACHINE FOR MAKING FROZEN CONFECTIONS

John F. Robb, Cleveland Heights, Ohio

Application July 13, 1932, Serial No. 622,352

19 Claims. (Cl. 107—8)

The devolpment of the art of frozen confections in the past decade has resulted in the production annually of many millions of such confections carried by sticks or handles. The stick frozen confection has become a tremendously accepted article of manufacture especially during the summer or warmer seasons of the year.

The purpose of this invention has been to design a machine which will eliminate, to a large extent, certain hand operations at present employed in the production of frozen confections of the character referred to.

In the carrying out of the invention, the machine thereof affords an economy in the cost of manufacture of the confections, which is material and considerable, and additionally, increases the possibilities of complete sanitary control of the production of the articles of manufacture.

The machine of the invention involves the employment of continuously and intermittently operating devices, in association, whereby ice cream or a similar body, which is liquid at normal temperature, is supplied to molds or otherwise formed into edible pieces or blocks. Preferably the ice cream, or an equivalent substance, in semi-viscous condition, is supplied to molds which are advanced mechanically, through a freezing tank or chamber, to more or less partially freeze the edible substance to ultimately form the confection or sucker. The said substance thus partially frozen in units shaped by the mold means, is advanced to a stick inserting or applying mechanism. The stick applying mechanism is adapted to push sticks into the confection units as they progressively pass through the machine.

After the sticks are entered into the confection units, the same pass on through the freezing chamber or receptacle and the sticks or handles are quite rigidly frozen into the confections. Thereupon, the confections are conveyed to a suitable point in the machine where heat is applied to the mold means to momentarily heat the mold and thus enable withdrawal of the confections therefrom.

Mechanical devices are arranged in proper position to engage with the sticks or handles of the confections, and remove them from the molds, which are at such time in an inverted position in respect to the conveying means.

The confection removing means which detaches the confections from within the molds, then passes on to a dipping or coating mechanism by which the confections will be coated with a coating of chocolate or some equivalent substance. Thereafter, the confections are carried forward to a bagging mechanism, bags known as glassene wrappers are applied thereto mechanically, and then the confections are dropped into conveying chutes or tubes that carry them to a packing mechanism, which packs these confections in a neat and orderly manner in cartons or boxes.

From the foregoing, it will be seen that the machine does the work of performing all the necessary operations in making the said frozen confections without there being any requirement of manual handling in the entire process or method of manufacture.

Now the invention herein involves the general machine of the combination of mechanisms which have been previously referred to.

In addition to the foregoing, the invention herein comprises the various individual mechanisms that are employed, and which go to make up the machine, but some of which might be used independently of other mechanisms of the machine, and therefore, are referred to as individual inventions and are claimed as such.

It is to be understood that I may substitute for the molding mechanism of this invention, suitable cutting mechanism, certain types of which have been known heretofore, and used in the art of making frozen confections. Certain parts of my machine may be employed with the cut frozen confection bodies equally as well as with molded confection bodies.

Included within the invention as specific mechanisms, is an improved measuring tank and valve mechanism for filling the molds with predetermined amounts of freezable substance as these molds progress through the freezing chamber.

Another feature of the invention resides in special stick inserting mechanism, wherein a magazine is employed to supply the sticks individually and segmental parts are utilized for movving the sticks into proper position to be pushed down into the confection bodies as they are carried within the molds.

Special instrumentalities are employed for causing partial inversion of the confections to release them from the molds after the mold walls have been heated momentarily to break the freezing connection of the confection body therewith. Novel heating means is employed in the nature of a moving receptacle containing warm water arranged to move into position so that each mold is immersed in the warm liquid therein.

The coating mechanism utilizes somewhat the same principle of operation as the confection releasing means in that the coating material is a bath carried in a receptacle movable so as to immerse the confection body in the coating material carried thereby. Of course, all of the parts referred to are working in timed relation as the machine carries forward its general operation.

Peculiar bagging instrumentalities are utilized employing pneumatic devices that are intended to spread the sides of the bags to separate the same, remove the bag from the magazine from which it is supplied, and hold it in a position in which the frozen confections may drop into the bag and by the inertia of the dropping thereof carry the bag and themselves to the chutes by which they are discharged to the packing mechanism. The packing mechanism itself stores or packs the confections in the cartons in which they are ultimately vended, and in which they may be stored in refrigerating containers.

In the drawings:—

Figures 1 and 2 are side elevations, illustrated in a somewhat diagrammatic manner and disclosing the general arrangement of my novel ice cream sucker machine. The right hand end of Figure 2 is illustrated in another showing of the drawings.

Figure 3 is an enlarged longitudinal sectional view through the front portion of the freezing brine tank and the mold filling devices. The valves of the mold filling device are shown in a filling position.

Figure 4 is an enlarged sectional showing of the mold filling apparatus, showing the valves which control the discharge of the ice cream mixture in a closed position.

Figure 5 is a vertical sectional cross view taken on the line 5—5 of Figure 3. A portion of the mold filling device is shown in elevation.

Figure 6 is a horizontal fragmentary sectional view of the stick inserting apparatus, illustrating the two exterior stick inserting instrumentalities.

Figure 7 is a fragmentary sectional view taken on line 7—7 of Figure 6 and illustrating particularly the construction of the stick inserting plunger.

Figure 8 is a fragmentary sectional view taken on line 8—8 of Figure 6 and illustrating in detail the stick inserting plunger.

Figure 9 is a diagrammatic detail view of the operating mechanism for the stick shifting segments.

Figure 10 is a diagrammatic illustration of the operating mechanism for the plunger.

Figure 11 is an enlarged fragmentary sectional view disclosing the heating instrumentalities for freeing the suckers from the molds.

Figures 12 and 13 are fragmentary horizontal cross sectional views showing the instrumentalities for removing the suckers from the mold. The full lines in Figure 12 show the grippers in open position, while the dotted lines in these figures show the same in clamped position supporting the suckers. The full lines in Figure 13 disclose the gripper frame projecting forward into cooperating position with respect to the sucker sticks or handles. The gripper jaws are illustrated in open position. The dotted lines in this figure disclose the gripper jaws in their closed or sucker gripping position and the gripper bar retracted with the grippers in gripping position supporting the suckers.

Figure 14 is a fragmentary sectional view showing in detail one end of the gripper bar and one pair of gripper jaws and discloses latch means for maintaining the jaws in gripped position with respect to the sucker sticks.

Figure 15 is an enlarged fragmentary side elevation of the parts shown in Figure 12, the full lines disclosing the grippers in alignment with the sucker sticks and the dotted lines showing the grippers projected forward into engagement with the sticks of the suckers. The gripper in the lower portion of this figure, show a sucker being carried thereby.

Figure 16 illustrates in a somewhat diagrammatic manner, the right hand end of the apparatus shown in Figures 1 and 2 and indicates more particularly the coating instrumentalities for the suckers.

Figure 17 is a fragmentary detail view of the coating mechanism. The receptacle containing the coating composition is illustrated in full lines in its normal position while the dotted lines show the same elevated so as to immerse the suckers therein. The ice cream sucker shown in the right hand position of this figure has been dipped and the coating composition is drying while it passes to the bagging apparatus.

Figure 18 is a diagrammatic side elevation of the bagging instrumentalities. The dotted lines in the center of this figure show the gripper arm in a lowered position, ready to deposit the sucker in the bag, while the dotted lines on the right and left portions of this figure show the bag holding arm shifted into cooperating position with respect to the bag magazines.

Figure 19 is a plan view of the parts illustrated in Figure 18, and discloses the bag magazines, the suction arms for holding the bags, and the shifting mechanism therefor.

Figure 20 is an enlarged sectional detail view taken on line 20—20 of Figure 19.

Figure 21 is a vertical sectional view taken approximately in line 21—21 of Figure 16.

Figure 22 is an elevation detail view disclosing the boxing or packing mechanism which receives the bags from the holders or suction nozzles after the suckers have been placed within the said bags. The said packing mechanism deposits the bagged suckers in the cardboard boxes ready for delivery to the consumer or distributor or for future cold storage.

Figure 23 is a sectional detail view of the sucker depositing mechanism, taken on line 23 of Figure 22, parts being shown in elevation.

Figure 24 is an enlarged detail view disclosing the method of operating the several doors and wire holding fingers of the depositing mechanism.

Figure 25 is an enlarged detail view of one of the power operated devices for actuating the several instrumentalities. The arrow shown in this figure indicates the movement of the projecting pins on the conveyer mechanism for tipping the power device into operation.

Referring now to the drawings and especially to Figures 1, 2, and 16, A and B designate the frame units of my novel machine for making ice cream suckers. These two frame units may be built as one continuous unit, if so desired.

The frames A and B are arranged in such a manner as to abut against each other at a point C. (See Figs. 1 and 2).

Frame A comprises the filling, freezing, stick inserting and molding instrumentalities, while the frame unit B includes the sucker removing mechanism, the chocolate coating mechanism, and the bagging and packing instrumentalities. The bagging and packing instrumentalities are not shown in the Figs. 1, 2 and 16, but are fully illustrated in some other showings of the drawings.

Referring now to Fig. 1, the frame 1 carries a pair of endless tracks or guides as indicated at 2 and 3. These endless tracks are disposed at opposite sides of the machine.

The tracks or guides 2 and 3 carry the multiple mold pans 4, as will be clearly seen in Figs. 1, 5 and 6. The said pans are provided with upper rectangular tray portions 5 having a plurality of sucker molds 6. Each of the trays 5 is further provided with rollers 7 arranged between the guide members 2 and 3 and adapted to operate therebetween. The molds 4 (see Fig. 1) are connected by link members 8. If it is desired to use more than one link connection between the trays 5 an intermediate roller 9 connected to such additional links may be operatively arranged within the guides 2 and 3, in the same manner as the roller 7, as previously described. Such additional links may be utilized for increasing or decreasing the distance between the trays 5 so that a larger or smaller amount of trays can be utilized in connection with this conveying mechanism.

In Fig. 1 there is shown a construction provided with a three link connection between each of the molds, while in the other more detailed views only two links are illustrated between each pair of mold pans. The amount of mold pans utilized in this machine will determine its output, and any plurality of mold pans may be provided as desirable for the manufacturing of a certain amount of frozen confection within a specific time.

As already mentioned, the mold pans in connection with the links form a continuous conveyor system arranged within the tracks 2 and 3, as will be clearly seen from Fig. 1. This conveyor or chain system is operated by any suitable driving instrumentalities in a step by step movement. Such driving mechanism is not illustrated in the drawings, as varying constructions of driving units may be advantageously employed in connection with this machine. The mold members are progressively moved in the machine in a direction as indicated by the arrow in Fig. 1, and each step of movement is adapted to bring the mold pans in proper cooperation with instrumentalities referred to later on.

Referring now to Fig. 3, it will be seen that one increment of movement of the machine will move the mold pan 4 from its dotted line position to its full line position in said figure, in which position it will be directly underneath the filling device, as indicated at 10. Each roller support adjacent the forward end of the mold pans 4 is provided with a pin projection 11 adapted to contact with a cam member 12 (see Fig. 3) to thereby rock the said cam lever 12, actuating the rod 13 in a downward direction. The filling device 10 comprises an upper compartment 10a which is of sufficient size to store a reasonable amount of ice cream mixture to be discharged therefrom into the mold pans. The bottom 10b of the said upper compartment 10a is provided with a plurality of passages 10c which may be closed or opened by means of valves 15 arranged therein. The filling device 10 is further provided with a plurality of measuring chambers 20 arranged below each passage opening of the upper compartment 10a. Each of the measuring chambers 20 is provided with openings 20a adapted to be opened or closed by valves 21. The stems of the valves 21 are arranged within the bores 21a of the stems 15a of the valves 15 in such a manner that both sets of valve stems of the valves 15, as well as of the valves 21, may be operated independently from each other so as to permit the opening of the valves 15 while the valves 21 are closed, and vice versa. The stems of both sets of valves are operatively connected by levers 16a and 16b with the rod 13, each lever ending in a collar 16c within which the rod 13 is slidably arranged. The end of the rod 13 is provided with an abutting member 16d and helical springs 14 and 14a are arranged between the members 16b and a collar 16c connected to rod 13 and between the abutting member 16d and the member 16a. The operation of the rod 13 by the cam member 12, the fulcrum point of which is arranged at 11a, will open and close the respective valves 15 and 21, as will be stated later on, so as to discharge the ice cream mixture from the upper compartment 10a into the measuring chamber 20, from where it then will be delivered into the molding pans 4.

The operation of the valves is as follows. Assuming that the lower compartment 20 is filled with a desired quantity of ice cream mix to be discharged, the movement of the rod 13 in a downward direction will cause compression of the right hand spring 14a which is forced against the right hand portion of the lever 16a. The left hand side of the lever 16a is moved upwardly, raising thereby the valve 21 from its seat in the lower compartment 20 and permitting the discharge of the ice cream from the said measuring chamber into the mold pan, while at the same time the valve 15 is forced to close by means of the compression of the spring 14 in a similar manner as has been described in respect to the opening of the valve 21. The release of the cam 12 will permit the rod 13 to move back to its original position whereby the valve 21 is closed while the valve 15 is opened to permit refilling of the measuring chamber.

The operation of the valves given above has been described only with reference to one set of valves, but obviously all the valves of the upper as well as of the lower compartment are correspondingly operated in unison with the herein described set of valves. The mold pans 4, which have now received sufficient quantities of ice cream mix as necessary for a certain size of sucker, are now moved forwardly by the next increment of movement of the conveying mechanism and the cam member 12 comes again into contact with the next extension pin 11, whereby the process of filling of the next set of molds is repeated. During the forward motion of the filled mold pan the cam member 12 is released, as previously stated, and the valve 21 is closed while the valve 15 is open, permitting the measuring chambers 20 to refill as the next mold pan moves into position under the discharge nozzles or openings 20a of the measuring chambers.

Referring again to Fig. 3, it will be seen that the mold pans 4 by moving from the dotted line position of said figure into their full line position enter a tray or receptacle 17 containing a brine freezing solution which is maintained at freezing temperature by the refrigerator pipes 18. The filled mold pans 4 are now moved forward toward the other end of the elongated freezing receptacle 17. During the conveying of the mold pans 4 through the freezing receptacle, the ice cream mix becomes somewhat frozen and plastic. A stick inserting mechanism 22 is mounted upon the tracks 2 in any convenient manner. The mold pans 4 containing the plastic ice cream are now directed underneath the said stick inserting mechanism, and it is to be understood that the ice cream is now sufficiently plastic to support a [stick or handle] member when placed therein.

The stick inserting mechanism is diagrammatically shown at 22 in Fig. 1, and detail views of the same are illustrated in Figs. 6 to 10. A mold pan is seen from the drawings to comprise six mold units for each mold pan (see Fig. 5), and disposed above the plane of each mold unit is a stick inserting device and an associated stick magazine.

Referring now to Figs. 6, 7 and 8, only one of these stick inserting devices will be described since the other five are identical. As seen in Fig. 7, the sticks 23 are arranged within an inclined stick magazine 24 and the said sticks are forced toward a stick handling segment 25 by means of a follower 26. The said follower is mounted on rollers 26a, adapted to travel upon the lower surface of the stick magazine 24. The segment 25 consists of a body portion secured to a shaft 27 mounted within the stick magazine. The said shaft 27 is actuated by a lever 28 which in turn is connected by the link 29 with driving instrumentalities adapted to shift the stick shifting segment incident to the rotation of a crank wheel 30. (See Fig. 9.) It will be seen that the connecting member 29 between the lever 28 and the crank wheel 30 is common for all of the levers 28 of the six stick inserting instrumentalities.

Figure 6, which illustrates the two exterior stick inserting devices, illustrates very well the segments which are provided with stick receiving grooves 31 which are normally in alignment with the stick magazine 24, but as soon as a mold pan 4 is moved under these stick inserting instrumentalities, a mechanism similar to that disclosed in Figure 25, is tripped, which cams the crank wheel 30 and accomplishes one revolution of the same, thus shifting the segment 25 and the groove 31 in which a stick 23 has been placed by the follower, as previously described, to a position adjacent to the stick inserting plunger 32, as illustrated in Figs. 6 and 8. At this time a crank wheel 33 which is operatively connected with the said stick inserting plungers 32 is given one full rotation by means of said connecting means, which comprise the actuating member 34 and bell crank lever 36. The plungers 32 are now moved downwardly and then upwardly again to the normal dotted line position illustrated in Fig. 8. During the downward movement of the stick inserting plunger 32 the shoulder 37 of the same engages the end of the stick 23, within the groove of the segment 25, causing downward movement of the same and inserting the stick into the plastic or partly frozen suckers contained in the mold pans 4.

After the insertion of the sticks into the plastic frozen suckers the mold pans 4 pass in to the brine tank 17 and the freezing is continued until the suckers are frozen hard, at which time the molds pass out of the freezing solution, as illustrated in Fig. 11. The molds containing the frozen confection are now conveyed directly above the hot water tank 35 which is utilized in freeing the suckers from the molds 4. The tank 35 (see Fig. 11) is mounted directly underneath the conveying system and arranged within the guides 37a in such a manner as to allow the vertical elevation of said tank directly underneath the conveying mechanism from which the molds 4 are projecting. The vertical elevation of the hot water tank 35 is accomplished by operation of the [instrumentalities for rotating] the cams 39 so that the same perform a complete revolution are similar to the instrumentalities shown in Fig. 25, which figure already has been referred to with respect to the operation of the stick inserting instrumentalities.

The operating instrumentalities shown in Fig. 25 consist of a worm F and a worm gear I, a jaw clutch K, a clutch operating lever P, a rod R connected to the said clutch operating lever P and operatively associated with a cam S. The clutch lever P is further provided with a roller W which is adapted to engage a groove V within the rim Z of the worm gear I. It will be noted that by the operation of the cam S by means of the extending pin projection 40 the rod R will be raised, causing disengagement of the roller W from the rim Z, while at the same time the jaw clutch K is engaged. Rotation will be now transferred from the shaft F' through the said clutch to the worm F, rotating the worm gear I for one revolution until the roller W falls again back into the groove V within the rim Z of said worm gear. The laterally extending pin 11 of the conveying mechanism has been moved out of the path of the cam S while the worm gear I was rotated, and therefore the entrance of the roller W within the groove V of the rim Z of the worm gear I will not be hindered, and disengagement of the jaw clutch members K will result, stopping the further rotation of the said worm gear I and the shaft L operatively connected with the said worm gear and adapted to carry the cams 39 which effect raising and lowering of the water tank 35. It will be seen therefore that one rotation of the cam 39 effected by the previously described driving instrumentalities will cause the raising of the water tank 35 from the full position in Fig. 11 to the dotted line position of the said figure. The pans 4 which contain the ice cream suckers will project into the water tank 35 for a short time until the said tank 35 is returned to its original position. The hot water is supplied to the tank by a pipe system 41 consisting of a flexible tube connection which will allow the sliding motion of the water tank, and the hot liquid of the water tank will supply sufficient heat to the mold pan 4 to free the ice cream suckers contained therein.

The mold pans are now moved forward and reach the downwardly curved portion of the tracks or guides 2 and 3, shown at the right hand of Fig. 1. This downwardly curved portion is also illustrated at the left side of Fig. 2. The pans come now to a momentary stop and will be in the position shown in Fig. 15. The pans are now in a horizontal position and are directly opposite the gripping fingers of the sucker conveyor 42, which is mounted within the frame unit B, as previously mentioned.

The frame B is provided with similar tracks or guides as referred to with respect to the frame A, and the said guides consist of the members 43 and 44 arranged in a spaced relationship. Between these tracks 43 and 44 is mounted a continuous conveyor chain system of links 43a which are similar to the links 8, as disclosed in Figs. 1 and 3, and connected together as shown at 44a. The said conveyor chain, which is generally indicated by the reference character 43b, is adapted to be moved in a step by step movement and driven in such a manner by the same driving as to accomplish a properly timed operation of both of the conveyor mechanisms.

In describing now the construction of one of the sucker conveying units, as particularly shown in Figs. 15 and 18, and the conveying chain 43b, it is to be noted that the carrier members 46 are arranged in spaced relationship between the chain links 43a. The said carriers 46 are provided with rollers 47 which are adapted to travel in the guides or tracks 43 and 44. These carriers are apertured at 48 and 49 so as to receive the slide rods 50.

A gripper carrier bar 51 is secured to one end of each pair of rods 50, while the other end of each of the rods 50 carries a collar 52. Disposed between the member 49 of the carrier 46 and the collar 52 there is a coil spring 53. The size and strength of the spring is important in the operation of the device, as will be explained later on.

The gripper or carrier bar 51 of each unit 42 has a plurality of pairs of sucker gripper fingers which have already been mentioned. The said gripper fingers are indicated at 45. The fingers are of a bell-crank construction and are pivoted at 55 to the bar 51. Certain of the laterally extending arms 56 of the bell crank gripper fingers are overlapped. However, all of the arms are slotted as illustrated at 57, and within these slots are arranged operating rods 58.

Disposed in the area of each of the carrier bars 51 there are gripper finger locking bars 60 which are mounted on guide rods 59. Springs 61 on the said guide rods 59 are for the purpose of normally holding the locking bars 60 away from the carrier bars 51. The locking bars 60 are apertured as shown at 62 to receive the finger actuating rods 58. Disposed between the bell crank arm of each gripper finger and the locking bar are coil springs 63. The total compression or tension power of all of the springs 61 and 63 is greater than that of the two springs 53 because it is not desirable to have any relative movement between the carrier bar 51 and the locking bar 60 except when the carrier bar is in its full projected position. This is illustrated in full lines in Figure 13.

Pivoted to the carrier bars 51 are latches 64, the fulcrum point of which is at 66. These latches are adapted to engage the ends 67 of the locking bars after the same have been moved toward the carrier bars 59, against the action of the springs 61 and 63. The springs 63 operate against the arms 56 of the bell crank when the locking bar 60 is held properly in place by means of the latches 64, and the spring pressure applied to the bell crank arms 56 will hold the gripper arms 45 in clamping position so that the same will firmly grasp the stick or handle of the sucker. These locking bars 60 are also provided with rollers 68 which are adapted to engage cams 69 as shown in Figure 13. Members 64 are under the tension of springs 65.

Referring now to Figures 12 and 13, it will be noted that when the gripper units 42 are in alignment with the sucker sticks, the roller 68 and the locking bars 60 will be directly in front of the cams 69 and when this alignment is accomplished, an operating mechanism, which is similar to the mechanism disclosed in Figure 25 and previously mentioned herein, is tripped by a projection on the conveyor or gripper unit. The cams 69 will now perform one complete revolution. The gripper carrier bar 51 is projected forwardly by the said actuation of the cams 69, and the springs 61 and 63, previously described herein, will maintain the proper spaced relation between the bars 51 and 60 until a stop collar 70 engages the shoulder 71 of the carrier 46, thus preventing further projection of the gripper fingers, and the bar 60 now moves forward alone and compresses springs 61 and 63, while the compression of the spring 63 in turn forces the gripper jaws to close and to firmly grasp the sucker handles or sticks. Extension of the projection 64 engages the bar 60 and prevents retraction of the same away from the bar 51. Cams 69 now return to their original position as shown in the dotted lines in Figure 13, and the springs 53 will cause the return of the gripper carrier bar 51, thereby withdrawing the suckers from the mold pans 4, as will be readily seen in dotted lines in Figures 13 and 12.

The sucker carrying units 42 are now moved forward progressively, and follow the downward curve of the guide tracks 43 and 44 as illustrated in Figure 15. The suckers will now swing from a horizontal to a vertical depending position as indicated in Figure 17. The arrangement of the lower track portion however, might be such as to provide a sufficient clearance space between the base of the machine and the suckers to provide sufficient space for the reception of the coating and bagging instrumentalities.

The suckers now come to a rest directly above a coating tank 72. The said coating tank 72 is provided with rollers 76 operatively arranged within guides 77 which are carried by the main frame of the machine. It will be readily seen that this arrangement provides a means for the vertical raising and lowering of the coating tank 72. A bell crank lever 78 is further connected to the coating tank 72 by means of a link 80 pivoted to the tank at 81 while the short arm 82 of the bell crank 78 which carries on its free end a roller 83 in operative engagement with the cam 73. The bell-crank lever 78 is pivotally mounted to the main frame at its fulcrum point 79. The cam 73 is actuated by instrumentalities similar to those disclosed in Figure 25, and as the same have been described previously in detail, their function will not be repeated herein.

The coating tank 72 contains a chocolate solution utilized for coating the frozen confections, the said chocolate solution being supplied to a flexible pipe 75 and discharged through a similar pipe 74.

The rotation of the cam 73, which rotation is accomplished by the driving instrumentalities previously referred to, actuates the bell crank lever 78 so as to raise the coating tank from its full line position in Figure 17 to its dotted line position, and to thereby immerse a sucker directly disposed above the said tank in the coating solution. The coating tank 72 is then lowered to its original position after the coating has been performed. This coating operation is done very quickly so as to prevent any melting of the frozen product. In a similar manner the rest of the ice cream suckers are coated according to the step by step operation of the machine.

The chocolate coated suckers are now permitted to dry during further conveyance of the same to the bagging apparatus, which will be now specifically described. The said bagging apparatus is illustrated in Figures 18 to 21.

Bag holders 84 and 85, as illustrated in Figures 18 to 20, provided with suction nozzles, are utilized for holding the paper bags in which the frozen confections are to be placed in proper position. Suction nozzles are further utilized to open the bags and to allow the insertion of the chocolate covered ice cream suckers over the conveyor tubes 86 which are directly below the said bag supporting instrumentalties, and the conveyor tubes 86 are arranged directly beneath the frozen confections at a point at which the same are released from the sucker carrying instrumentalities. Although the suction is sufficient to support and open the paper bags in which the suckers are to be placed, the suction is not great enough to hold said bags in place when the ice cream sucker is placed therein. Therefore, when the carrier bars 51, see Figure 21, are moved downwardly by the cams 88, as seen in dotted lines in the said figure, and the latches 64 are released by cams 88a which are integral with the cams 88, continued rotation of the cams 88 will then permit the tension on the springs 61 to separate the locking bar 60 from the carrier bar 51, which in turn causes the opening of the gripping fingers 45, thereby releasing the suckers and allowing them to drop from the position shown in dotted lines in Figure 1, into the paper bags arranged directly therebeneath and held properly in place by their respective supporting arms.

The increased weight to be carried by the paper bag supporting arms by the insertion of the suckers into the bags exceeds the holding force created by suction in these holder arms of the paper bags, and the bags will become detached from these holding units, thereby dropping into conveyor tubes 86. It will of course be noted that there is a conveyor tube underneath every bag holding device so that all of the suckers now arranged in the paper bags may be conveyed at the same time to the packing instrumentalities.

The carrier unit from which the suckers have been released move further forward and the pin on this unit, previously referred to, trips a driving mechanism similar to the mechanism first disclosed in Figure 25 which causes one revolution of a shaft 90 which is illustrated in Figure 19. The suction heads 84 which are slidably arranged, as will be readily seen by reference to Figure 19, move from their just described bag holding position rearwardly to points in advance of the bag magazines 91 and 92 as seen in dotted lines in Figure 18. Supporting guides 93 are provided to slidably carry the suction tubes 94 which are pivoted at 95, see Figure 18, so as to swing laterally, and the supporting guides are further connected together by the actuating rods or bars 96, which are in turn connected together by means of bell cranks 97 and link 98. The sliding movement of the suction pipes 94 is accomplished by crank wheels 99, crank links 100, and the levers 101 which engage slots 102 in the depending arms 103 which are secured to the suction pipes 94 as will be readily seen from Figure 18.

A cam 104 is utilized for moving the suction nozzles 84 toward the bag magazines, or, as the case may be, against the other suction nozzles 85, cam-like extensions 104a and 104b on the cam 104 being provided for this purpose.

The cam 104 and the crank wheels 99 are rotatably connected together by means of shafts 105, level gears 106, shafts 107, 108, and pinion gears 109, and the operation of this mechanism is as follows:

After shaft 90 is set into rotation by the driving instrumentalities, see Figure 25, previously described, the crank wheels are first operated to cause the suction nozzles 84 to slide adjacent the bag magazines 91. The cam portion 104a, as illustrated in Figure 19, now rocks a lever 110 to the right, thus operating bell cranks 97 and thereby shifting rods 96 to swing the suction nozzles against the first of the bags contained in the magazines 91 and 92. The cam 104a now moves away from its position under the lever 110 and permits the nozzles to move away from the bag magazine while the suction applied to the nozzles facilitates thereby the removal of one bag to be supported by only one arm of the bag supports. The crank wheel 99 now completes its rotation and returns the suction nozzle which carries the paper bag back to its original position, and the other cam portion 104b facilitates the contacting of the suction nozzles 84 and 85 so that the stationary nozzles 85 will grab the other side of the bag. The cam portion 104b moves now away from under the lever 110 which permits the nozzle 84 to move back to its original position away from the nozzle 85 to thereby open the bag while the same is held securely in position on the said suction nozzles 84 and 85. The bags are now in position to receive the suckers.

The operation of these instrumentalities is so timed that whenever a set of suckers is discharged from the carrying members, the paper bags will be in proper position and sufficiently opened to receive the frozen confections.

There are, of course, instrumentalities which maintain the suction in the nozzles 84 and 85 at all times at a constant rate, but such instrumentalities have not been described herein as the same may be of any suitable design. Only the flexible hose members 84a and 85a have been illustrated.

As previously described, the bagged frozen confections are dropped into conveying tubes from where they are deposited into cartons or boxes in which they are distributed for the purposes of trade, cold storage, or the like. This packing operation is the final step in the operation of the machine, and in the following, there will be given a detailed description of these packing instrumentalities which are illustrated in Figures 21 to 24.

Referring to Figure 21, it will be noted that the bagged frozen confections have been dropped into the conveying tubes 86 as already previously mentioned, and the suckers slide downwardly into the depositing apparatus as shown at 111 in Figure 22. The said depositing means are arranged at the end of the conveyor tubes or chutes 86 in a longitudinal plane thereto. It will be further noted that the conveying tubes 86 converge toward a common central vertical plane. It will further be observed that the curvature of the tubes 86 is such as to reduce considerably the momentum of the suckers so that no damage is done to the frozen confections during their downward slide into the depositing section 111.

A crank wheel 112, see Figure 22, is suitably arranged in the frame of the machine and is actuated by a single revolution control power device, the construction of which is similar to the instrumentalities disclosed in Figure 25. The said device is tripped into operation by the beforementioned projection on the carrier 46 as it moves away from the above-described bagging device and the lowering and raising of the member 111, which may be also described as an elevator, is thereby facilitated. The elevator 111 is arranged for vertical movement within the guides 113 secured at 114 to the side walls of the conveyor tubes 86.

The lever 115 which is adapted to operate the elevator is pivoted as at 116 to a bracket 116a secured to the chute 86. The bifurcated end 117 of the lever 115 is utilized to receive the projections 118 which are secured to the elevator 111. The elevator 111 is further provided with projections 119, which, in cooperation with the before-mentioned projection 118, maintain the elevator in proper operative position during its raising and lowering movements.

A pair of links 120 are adapted to connect the crank wheels 112 with the operating lever 115 so that a single rotation of the crank wheel 112 will lower the elevator to the position shown in dotted lines in Figure 22 and will then raise the elevator again up to its full line position in the said figure.

Referring now to Figure 23, which is a sectional view of Figure 22 taken on the section line 23—23, it will be noted that in this illustration there are shown two outside tubes or chutes 86 and a portion of the elevator 111.

The said elevator is provided with a plurality of compartments 111a, 111b, 111c, etc., each of which is provide with a pair of doors 121 which normally are held in closed position by means of the projecting arms 122 which are carried by the chute unit 86. The doors 121 are secured together in groups, see Figure 24, and one set of the said doors is operated by the outside door on one side of the elevator, while the other set of doors 121b is operated by a similar arm 122 which is not illustrated in the drawings, located on the other side of the elevator. Both of these outside doors carry a cam 123 which operates the arm 122 while the elevator is raised so that the top surface of the doors form a continuation of the bottom of the conveyor tubes 86. The groups of doors as shown in Figure 24 are connected together by means of rods 124 and 125.

Fingers 126 and 127, preferably made from wire, are pivoted to the elevator unit and normally extend partly across the space below the doors 121a to 121b. These wire fingers are also connected in groups similar to the doors 121a and 121b by the rods 128 and 129. The two outside wire fingers constitute the operating fingers for the intermediate fingers.

Each side of the elevator 111 is provided with a slide rod 130, the said slide rod being supported in guides 131. These guide rods 131 are provided with shoulders 132 and 133 which are disposed in the path of the projections 134 carried by the guide brackets 113 of the elevator. When the elevator is lowered and reaches its lowermost position, the projection 134 of the guide bracket strikes the shoulder 133 on the slide rod 130, causing the rod to be moved upwardly. The before-described movement of the slides 130 removes the retaining extension part 130a from its engagement with the cross wire 135 which permits the wire finger to swing open. As the elevator is raised, the projection 134 will strike the shoulder 133 of the slide 130, forcing the slide downward, and the cam end 136 of the slide engages the cross wire 135, thus forcing the wire finger 126 to close. The doors 121 will first be opened, permitting the suckers in the compartments 111a, 111b, etc. to drop into the crossed wire fingers 126 and 127, which fingers will remain crossed as the elevator 111 is lowered. Upon final lowering movement, the wire fingers will be released, which is due to the upward movement of the slide 130, and the suckers will be permitted to slide into the cartons 137.

The cartons 137 may be of any desirable size or shape, but I prefer to illustrate a carton containing a dozen suckers, one-half dozen of the said confections being deposited in each side of the box. These cartons 137 are positioned in box holders 138 which are carried by any suitable conveyor mechanism as shown at 139. The operating instrumentalities for this conveyor mechanism are not illustrated, but may be of any suitable construction. The box-holders 138 are of such a construction that the same may be rotated one-half a revolution so as to permit the rotation of the box to place its other half under the elevator.

When the box is filled with the frozen confections, the conveyor mechanism which carries the said boxes is advanced and will come to a stop when the next box is underneath the elevator, whereby the step of packing of the frozen confections into the box is repeated in a manner similar to that previously described. The boxes are now sealed by means of any suitable machinery or by hand labor. The boxes which are filled with the ice cream confections are moved to a cold storage compartment, or may be distributed immediately.

Having thus described my invention, what I claim as new and desire to secure by Letters Patent of the United States, is—

1. In a machine for making frozen confections, the combination of a conveyor a mold operable thereby, a stick inserting mechanism for applying a stick to the contents of the mold, means for freezing the stick in the substance within the mold, a second conveyor associated with said first conveyor, and instrumentalities carried by the second conveyor to engage the stick in the substance in the said mold and to withdraw the substance with the stick embedded therein from the mold.

2. A machine as claimed in claim 1, combined with instrumentalities for heating the mold on the first conveyor in order to release the substance frozen therein so that the stick and said substance may be withdrawn by the devices carried by the second conveyor for such purpose.

3. A machine as claimed in claim 1, combined with a mechanism for releasing the frozen substance in the mold of said first conveyor, including a receptacle containing a warm fluid and movable so that the mold will be immersed therein at timed intervals.

4. A machine as claimed in claim 1, with instrumentalities associated with the second conveyer including a receptacle containing a coating material and means for causing relative movement of the said receptacle and the frozen substance carrying means of the second conveyer whereby to coat the frozen substance as it moves in the machine.

5. In a machine for making frozen confections, in combination, a pair of conveyers moving in synchronism, frozen confection carrying means on one of said conveyers, frozen confection removing means carried by the other conveyer, means for releasing the confections from the first conveyer, and means for releasing the confections from the second conveyer.

6. In a machine for making frozen confections, in combination, a pair of conveyers moving in synchronism, frozen confection carrying means on one of said conveyers, a freezing means associated with the first conveyer, stick feeding means associated with the first conveyer to insert sticks in the frozen confections frozen thereby during the freezing action, releasing devices for releasing the confections from the first conveyer, confection gripping and carrying devices to engage the sticks of the confections and carried by the second conveyer, and means for releasing the confections from the second conveyer as set forth.

7. A machine as set forth in claim 1, including a receptacle containing coating material associated with the second conveyer, and mechanism to move the receptacle to submerge the confections on the second conveyer therein and thus coat them, as the second conveyer operates.

8. A machine as set forth in claim 1, including a receptacle containing coating material associated with the second conveyer and mechanism to move the receptacle to submerge the confections on the second conveyer therein and thus coat them, as the second conveyer operates, combined with releasing means for releasing the freezing connection between the confections and the first conveyer including a receptacle containing a warm fluid with devices to move said receptacle into heating relation with the confection on the first conveyer.

9. A coating device for machines for making frozen confections, comprising a frame and a conveyer, a confection molding device carried thereby, a guide on the frame, a receptacle containing a coating substance, rollers on the said receptacle arranged to slide within the guide, instrumentalities for moving the said receptacle comprising a bell-crank lever and a link adapted to pivotally connect the bell-crank lever with the receptacle, a roller on the said bell-crank lever, a cam adapted to transfer motion to the said roller and bell-crank lever in timed relation to the operation of the conveyer to thereby move the receptacle so as to submerge the confection carried by the conveyer in the coating substance of said receptacle.

10. A releasing device for machines for making frozen confections, consisting of a conveyer, a confection holding device carried thereby, a receptacle containing a hot substance and devices for moving the receptacle so as to immerse the confection holding device carried by the conveyer in the said substance incident to the operation of the conveyer.

11. A stick inserting mechanism for a machine of the character described, comprising a stick magazine, feeding instrumentalities within the said magazine, a stick discharging mechanism operatively connected with said magazine consisting of a stick handling segment provided with a groove, adapted to move sticks from the magazine to expelling position, and expelling instrumentalities adapted to expel a stick from the said segment and to insert the same into the confection substance.

12. A stick inserting mechanism for a machine of the character described, comprising a stick magazine and a stick handling device adapted to be supplied with sticks from said magazine, the stick handling device comprising a segment movably arranged with respect to the magazine and being provided with a groove adapted to receive a stick from the said magazine and to move it to expelling position, expelling instrumentalities in cooperation with the segment and groove adapted to expel a stick moved to expelling position by the segment.

13. In a frozen confection making machine, a conveyer, a mold carried by the conveyer, a stick inserting mechanism comprising a stick magazine and discharging instrumentalities adapted to insert a stick into a substance within the mold, incident to the operation of the conveyer, means for freezing the stick in the substance within the mold, a second conveyer associated with said first conveyer, and instrumentalities carried by the second conveyer for engaging the stick in the substance in the said mold and withdrawing the substance with the stick embedded therein from the mold.

14. In a frozen confection making machine, a mold carried by the conveyer, a stick inserting mechanism comprising a stick magazine and a stick handling device adapted to be supplied with sticks from said magazine, the stick handling device comprising a segment movably arranged with respect to the magazine and being provided with a groove adapted to receive a stick from the said magazine and to move it to expelling position, expelling instrumentalities in cooperation with the segment and groove adapted to expel a stick to insert the same in the substance in the mold, means for freezing the stick in the substance within the mold, a second conveyer associated with the first conveyer, and instrumentalities carried by the second conveyer to engage the stick in the substance in the said mold and withdrawing the substance with the stick embedded therein from the mold.

15. In a machine for making frozen confections, the combination with a frame, of a conveying device within the said frame, confection molding and carrying instrumentalities operatively connected with the said conveying device, filling devices for the molding instrumentalities adapted to discharge a substance to be frozen within the said molding instrumentalities, measuring means operatively connected with the filling devices actuated by the conveying device to discharge a predetermined amount of substance into the molding instrumentalities incident to the operation of the conveying device, mechanism for applying a stick to the contents of the molding instrumentalities, means for freezing the substance within the molding instrumentalities, a second conveyer system associated with said first conveying devices, and instrumentalities carried by the second conveyer to engage the stick in the substance in the molding instrumentalities and withdrawing the substance with the stick embedded therein from the molding instrumentalities.

16. In a machine for the production of frozen confections, the combination with a frame, a conveyer, confection molding means on the said conveyer, filling and stick inserting means operatively associated with the said conveyer and molding means, a second conveyer, confection removing and carrying instrumentalities on the second conveyer, coating instrumentalities in cooperation with the second conveyer, of bagging instrumentalities adapted to bag the confections produced in the said machine and to permit the bagging and discharge of the confections through their own force of gravity.

17. A machine for making frozen confections, which comprises cooperating conveying systems, one of the said conveying systems carrying a series of molds adapted to receive confection making material, freezing means associated with the said conveyer for freezing the material in the molds, carrying mechanism on the other of the said conveying systems for removing the frozen confections from the molds, and coating devices in cooperation with the second conveyer, the second conveyer being adapted to convey the frozen confections through said coating devices to thereby apply a coating to the said confections.

18. A machine for making frozen confections comprising synchronized conveying systems, one of the said conveying systems carrying a series of molds adapted to receive confection making material, freezing means associated with the said conveyer for freezing the material in the molds, frozen confection removing mechanism on the other of the said conveying systems carrying the frozen confections from the molds, the second conveyer being adapted to convey the frozen confections through coating devices adapted to apply a coating to the said confections.

19. In a machine for the production of frozen confections, in combination, a frame, synchronized conveying system, molding instrumentalities carried by one of the conveying systems adapted to receive confection substance, freezing devices for freezing the confection substance, handle inserting instrumentalities for inserting handles in the confection substance during its freezing, heat applying means releasing the hard frozen substance within the molding instrumentalities, confection removing devices on a second conveyer system adapted to remove the frozen confections from the molding instrumentalities of the first conveying system, coating instrumentalities for coating the confection conveyed by the second conveying systems and devices in cooperation with the second conveying system for bagging and packing the frozen confections.

JOHN F. ROBB.